United States Patent
Tseng et al.

(10) Patent No.: US 7,800,992 B2
(45) Date of Patent: Sep. 21, 2010

(54) OPTICAL DISC DRIVE AND METHOD THEREOF

(75) Inventors: Te-Wang Tseng, Hsinchu County (TW); Chih-Chiang Chu, Taoyuan County (TW)

(73) Assignee: Mediatek Inc., Hsin-Chu (TW)

( * ) Notice: Subject to any disclaimer, the term of this patent is extended or adjusted under 35 U.S.C. 154(b) by 735 days.

(21) Appl. No.: 11/738,551

(22) Filed: Apr. 23, 2007

(65) Prior Publication Data

US 2008/0259752 A1 Oct. 23, 2008

(51) Int. Cl.
  *G11B 7/00* (2006.01)
  *G11B 27/36* (2006.01)
(52) U.S. Cl. .................. 369/44.32; 369/53.16
(58) Field of Classification Search ............ 369/44.32, 369/44.29, 44.25, 53.12–53.17
See application file for complete search history.

(56) References Cited

U.S. PATENT DOCUMENTS

| | | | | |
|---|---|---|---|---|
| 4,587,644 A * | 5/1986 | Fujiie | ............... | 369/53.15 |
| 6,046,967 A | 4/2000 | Takagi et al. | | |
| 6,292,913 B1 * | 9/2001 | Son | ............... | 714/718 |
| 6,801,482 B1 * | 10/2004 | Iijima et al. | ............... | 369/47.14 |
| 7,134,051 B2 * | 11/2006 | Takaichi | ............... | 714/42 |
| 7,336,569 B2 * | 2/2008 | King et al. | ............... | 369/44.29 |
| 2004/0130982 A1 * | 7/2004 | Lee et al. | ............... | 369/44.32 |
| 2006/0039252 A1 * | 2/2006 | Chu | ............... | 369/44.32 |
| 2006/0056088 A1 * | 3/2006 | Kudoh et al. | ............... | 360/31 |

FOREIGN PATENT DOCUMENTS

JP      2006286112      10/2006

OTHER PUBLICATIONS

CN Office Action mailed Jul. 17, 2009.
English abstract of JP2006286112.

* cited by examiner

*Primary Examiner*—Thang V Tran
(74) *Attorney, Agent, or Firm*—Thomas, Kayden, Horstemeyer & Risley

(57) ABSTRACT

An optical disc drive and method thereof. The optical disc drive comprises a rotating means, an optical pickup head, a servo unit, and a controller. The rotating means rotates an optical disc. The optical pickup head generates an optical beam to detect defects in a predetermined range on the optical disc. The servo unit, coupled to the optical pickup head, is responsive to an operating parameter to control the optical pickup head. The controller, coupled to the optical pickup head and the servo unit, identifies a defect type based on the defect detection result; and determines the operating parameter of the servo unit according to the defect type.

16 Claims, 5 Drawing Sheets

OPTICAL DISC DRIVE AND METHOD THEREOF

BACKGROUND OF THE INVENTION

1. Field of the Invention

The invention relates to optical disc drives, and in particular to an optical disc drive with improved playability and a method thereof.

2. Description of the Related Art

Optical discs include read-only types (e.g. CD-DA, CD-ROM, DD-ROM, DVD-Video, DVD-ROM), write-once recordable types (e.g. CD-R, DD-R, DVD-R, DVD+R), and rewritable types (CD-RW, DD-RW, DVD-RW, DVD+RW, DVD-RAM, Blu-ray Disc). An optical disc drive accesses optical discs with a laser beam to either in a continuous spiral or in concentric circles, in which data is prerecorded during the manufacturing process for read-only media or can be written to recordable and rewritable media. In the subsequent descriptions, the expression "playing" a disk will be used for writing as well as for reading (playback).

In optical disc drives, optical pickup heads read track information and servo units accurately follow the track according thereto in three dimensions, radial, focus, and rotational speed. In normal operation, the servo unit obtains information from the optical pickup head and uses it to determine whether the optical pickup head is correctly positioned with respect to the track, and if not, what corrective action is needed. This operation takes place automatically by employing control loops with no need to adjust the servo settings while tracking or focusing with the laser beam.

The optical disk may, however, suffer from mechanical defects such as scratches, fingerprints, dust, dirty areas that obscure data in the disc, which may not only affect decoding of the retrieved data, but also disrupt servo function. Disc playability can be enhanced by assigning specific operating parameters of servo units to all defective area. However, this approach does not optimize the disc playability.

Thus a need exists for an apparatus and method to provide optimal operating parameters to access defective area on optical discs.

BRIEF SUMMARY OF THE INVENTION

A detailed description is given in subsequent embodiments with reference to the accompanying drawings.

A method of controlling an optical disc drive comprises detecting a defect in a predetermined range of an optical disc, identifying a defect type, and setting an operating parameter of the optical disc drive according to the defect type.

According to another embodiment of the invention, an optical disc player comprises a rotating means, an optical pickup head, a servo unit, and a controller. The rotating means rotates an optical disc. The optical pickup head emits an optical laser beam to detect a defect in a predetermined range on the optical disc. The servo unit, coupled to the optical pickup head, is responsive to an operating parameter to control the optical pickup head. The controller, coupled to the optical pickup head and the servo unit, identifies a defect type and sets the operating parameter of the servo unit according to the defect type.

BRIEF DESCRIPTION OF THE DRAWINGS

The invention can be more fully understood by reading the subsequent detailed description and examples with references made to the accompanying drawings, wherein:

FIG. 3b shows a method for classifying the defect type in 3a.

FIG. 5b is an illustration of the method for classifying the defect type in 5a.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
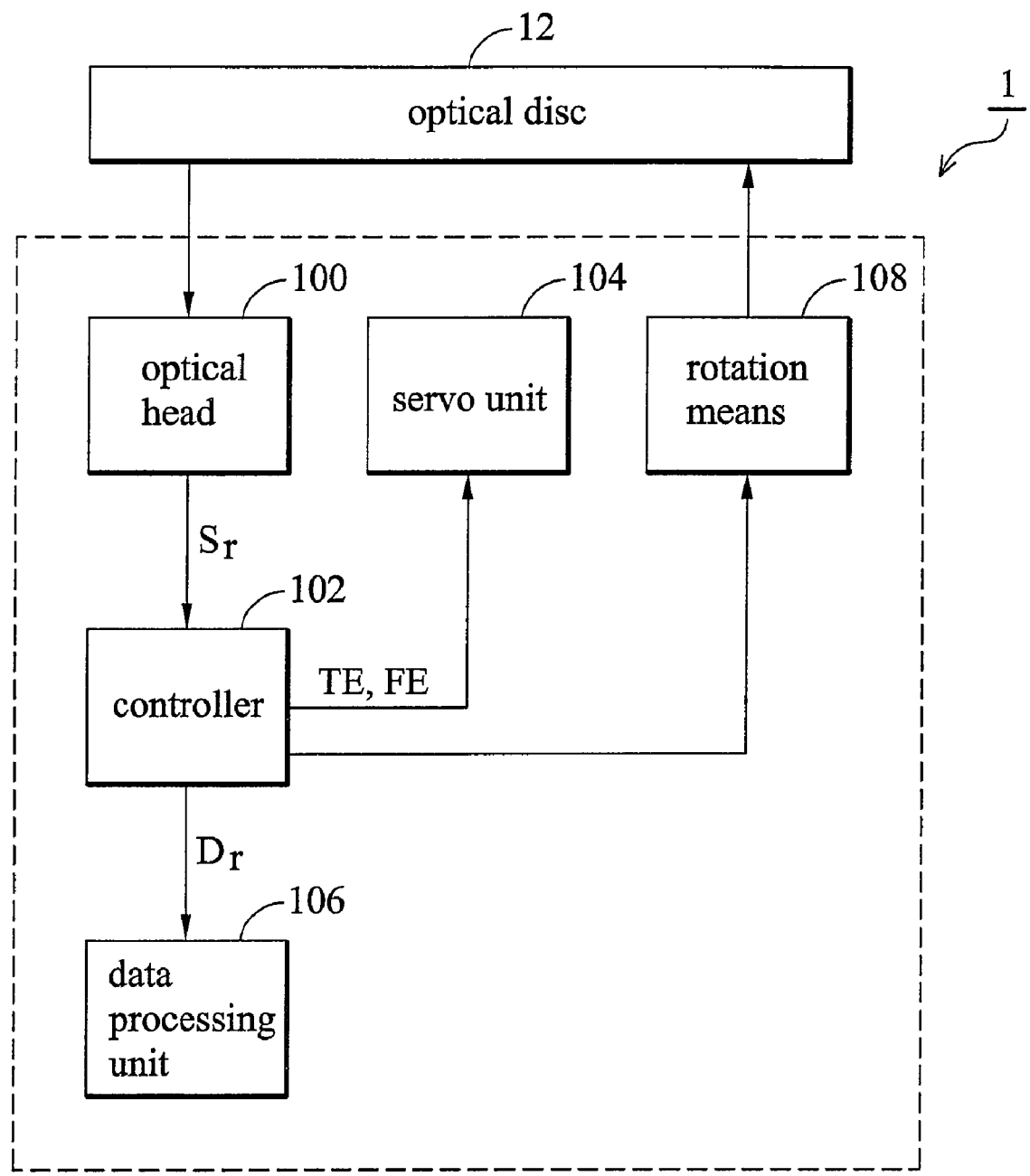
FIG. 1 is a block diagram of an exemplary optical disc player according to an embodiment of the invention.

FIG. 1 is a block diagram of an exemplary optical disc player according to an embodiment of the invention, however, it is equally applicable to an optical disc recorder. Optical disc player 10 comprises optical pickup head 100, controller 102, servo unit 104, data processing unit 106, and rotation means 108. Optical pickup head 100 is coupled to controller 102, in turn coupled to servo unit 104 and data processing unit 106.

Optical pickup head 100 scans the surface of optical disk 12 with an optical beam to derive read signal $S_r$ therefrom. When surface defects such as fingerprints, dust, or scratches occur on the surface of optical disk 12, optical pickup head 100 detects the same by sensing high reflectivity of the reflected optical beam. Recorded data $D_r$ can be derived from Read signal Sr, as well as information associated with the track structure of optical disc 12; i.e., focus and tracking information, indicating weather optical pickup head 100 is off-track or defocused from the tracks on optical disc 12. For a blank optical disc, recorded data $D_r$ comprises clock information, or wobble signal, and address information, including track number and block number. For a recorded disc, recorded data Dr further comprises user data. In normal operations, controller 102 receives read signal $S_r$ to extract recorded data $D_r$ for data processing unit 106, and focus error information FE and tracking error information TE for servo unit 104, thereby accessing data and controlling the radial position of optical pickup head 100 remaining on the track of optical disc 12.

When optical pickup head 100 detects a surface defect on optical disc 12, read signal $S_r$ is distorted, such that data and information carried by read signal $S_r$ might not be used. Controller 102 identifies a defect type, and determines one or more operating parameter based thereon. The defect type may be determined according to the number $N_d$ of defects in a predetermined range $R_d$, the maximum width $W_{dmax}$ of the defects, or the combination. The operating parameter may be one or a combination of focus error signal FE, tracking error signal TE, focus gain, tracking gain, Phase-Locked Loop (PLL) gain and operating bandwidth, and filter bandwidth setting in data processing unit 106. Controller 102 may further access a lookup table comprising a defect type with the corresponding configuration of the operating parameters.

Figure 2:
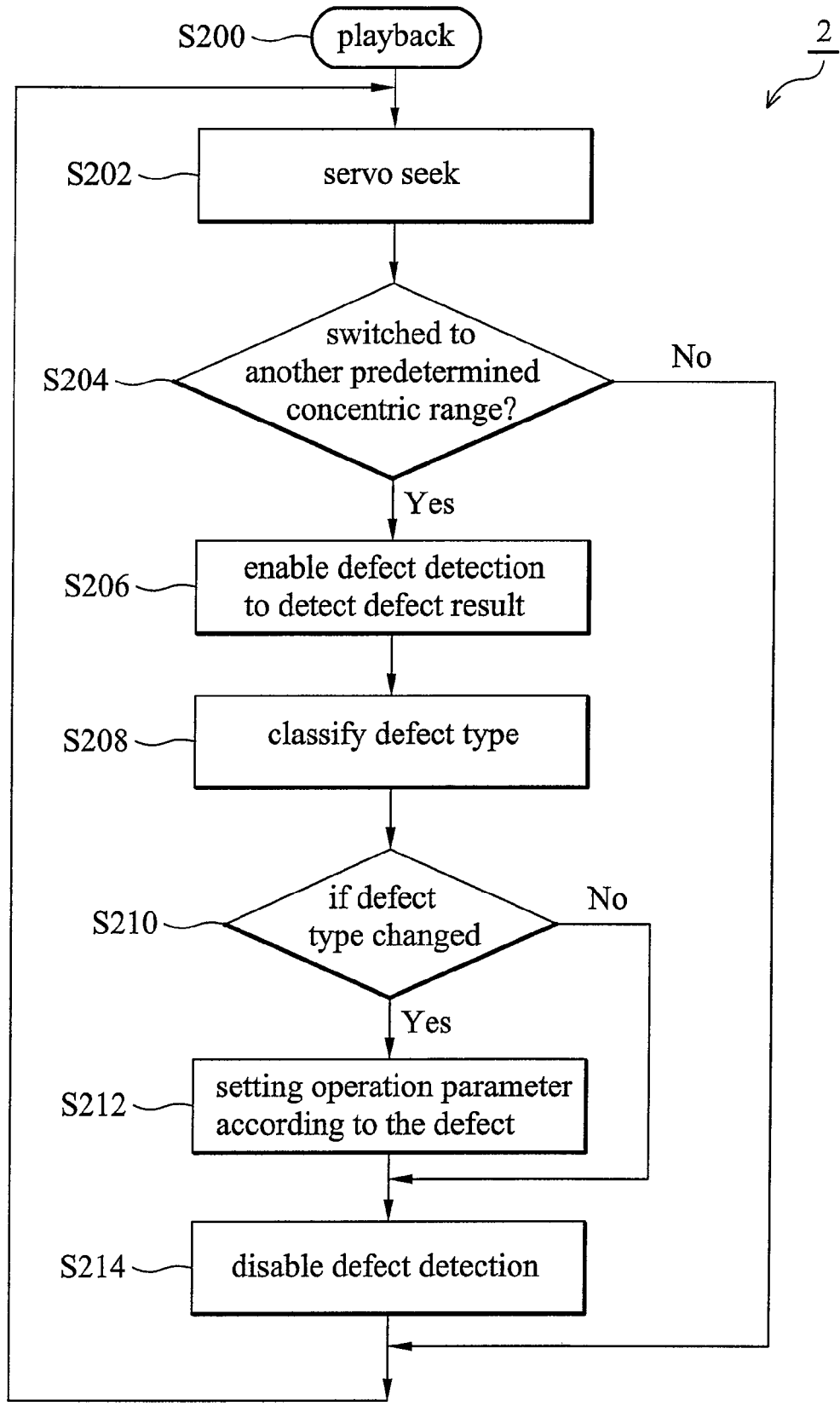
FIG. 2 is a flowchart of an exemplary method of controlling an optical disc drive, incorporating the optical disc player in FIG. 1.

FIG. 2 is a flowchart of an exemplary method for controlling an optical disc drive, incorporating the optical disc player in FIG. 1.

Upon playing optical disc 12 in step S200, optical pickup head 100 searches along a track thereof (S202) to obtain the address information, which can be used to determine the location of optical disc 12 read by the optical pickup head 100 into a plurality of predetermined concentric ranges.

Optical disc 12 can be divided into a plurality of predetermined ranges (or zones), typically the disc is segmented into concentric zones, for example, a first range of a DVD disc contains addresses 30000 to 64FFF, a second range contains addresses 65000 to 99FFF, etc. In step S204, controller 102 determines if the address information changes from one to the other predetermined range, and initiates a defect detection process (S206) if so. If the address remains in the same predetermined range, controller 102 controls servo unit 104 and optical pickup head 100 to seek the next position along the track (S202).

In step S206, optical pickup head 100 detects all defects along tracks in the predetermined range, and controller 102 obtains defect information by calculating the total number $N_d$ and determining the maximum width $W_{dmax}$ of the defects. The defect detection may be performed on only a portion of the range for each predetermined range, for example, detecting only one cycle for each concentric range.

Figure 3A:
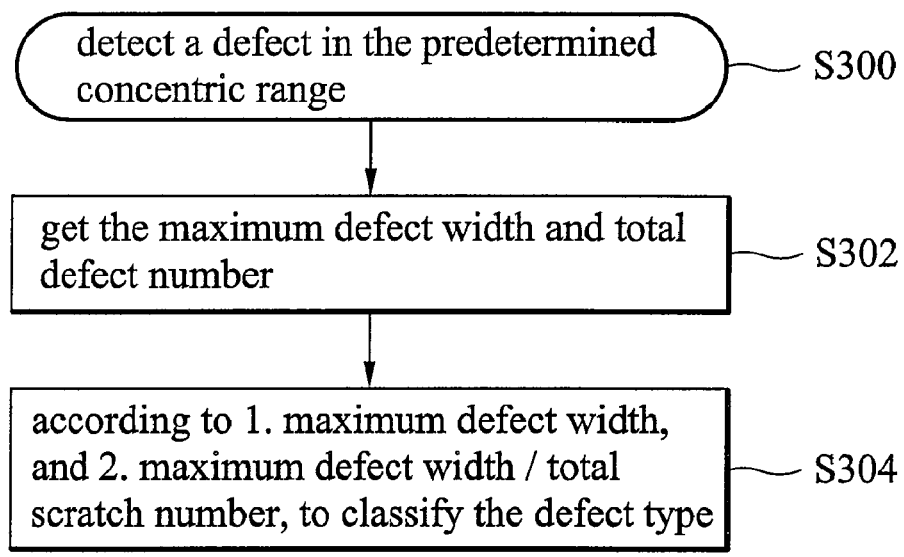
FIG. 3a is a flowchart of an exemplary method for classifying a defect type, incorporated in the methods in FIG. 2 and the optical disc player in FIG. 1.
Figure 3B:
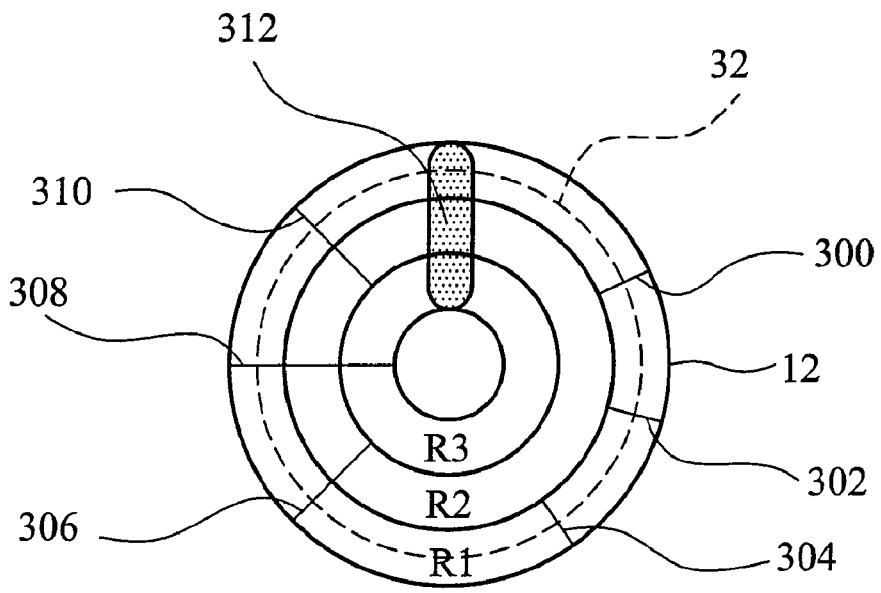

FIG. 3a is a flowchart of an exemplary method of classifying a defect type, as shown in FIG. 2 and the optical disc player in FIG. 1. FIG. 3b illustrates the defect type classification method of FIG. 3a. As shown in FIG. 3b, optical disc 12 comprises predetermined ranges R1 to R3, and there are many defects 300 detected in area 312. Optical pickup head 100 detects $N_d$ defects along cycle 32 in predetermined range R1, and the width of the longest defect is $W_{dmax}$. Referring to FIG. 3a for defect detection and classification, in step S300, optical pickup head 100 detects all defects along one cycle (32) in the predetermined range (R1). In step S302, controller 102 calculates total number of defects $N_d$ and maximum width $W_{dmax}$. In step S304, controller 102 classifies the detection type according to maximum width $W_{dmax}$ and the ratio of maximum width $W_{dmax}$ to total number $N_d$.

Referring to FIG. 2, in step S208, controller 102 classifies the defect type based on total number $N_d$ and the maximum width $W_{dmax}$ of the defects. In some embodiments, the defect type may be determined by a single measure such as total number of defects, or the defect type may be classified by a certain set of rules. Controller 102 may classify the defect type based on the distribution of the defects on the tracks of the predetermined range. For example, controller 102 computes a ratio of the maximum width $W_{dmax}$ to number of the defects $N_d$, classifies the defect type as a concentrated defect type if the ratio exceeds or equals a predetermined ratio threshold, and classifies the defect type as a dispersive defect type if the ratio is less than the predetermined ratio threshold.

In step S210, controller 102 checks whether the defect type has been changed, and, if so, determines one or more operating parameter according thereto (S212), and, if not, the operating parameters remains the same and the defect detection is disabled (S214).

In step S212, controller 102 determines the operating parameters according to the defect type, thereby optimizing the playability of optical disc player 10. In some embodiments, the operating parameters include servo parameters. The determination of the operating parameter may include fixing focus error signal FE and tracking error signal TE at a predetermined value, a value immediately before the defective location, or a value after passing a low pass filter; increasing or decreasing the gain of focus error signal FE and tracking error signal TE; adjusting defect threshold level; fixing PLL gain and bandwidth at a predetermined value or a value immediately before the defect detection; and fixing the bandwidth of the filters in data processing unit 106 at a predetermined value or a value immediately before the defect detection. Controller 102 may deploy lookup table 1020 to determine the corresponding configuration of the operating parameters by the defect type.

In step S214, controller 102 disables the defect detection, and enables servo unit 104 and optical pickup head 100 to seek a subsequent track location in step S202.

Figure 4:
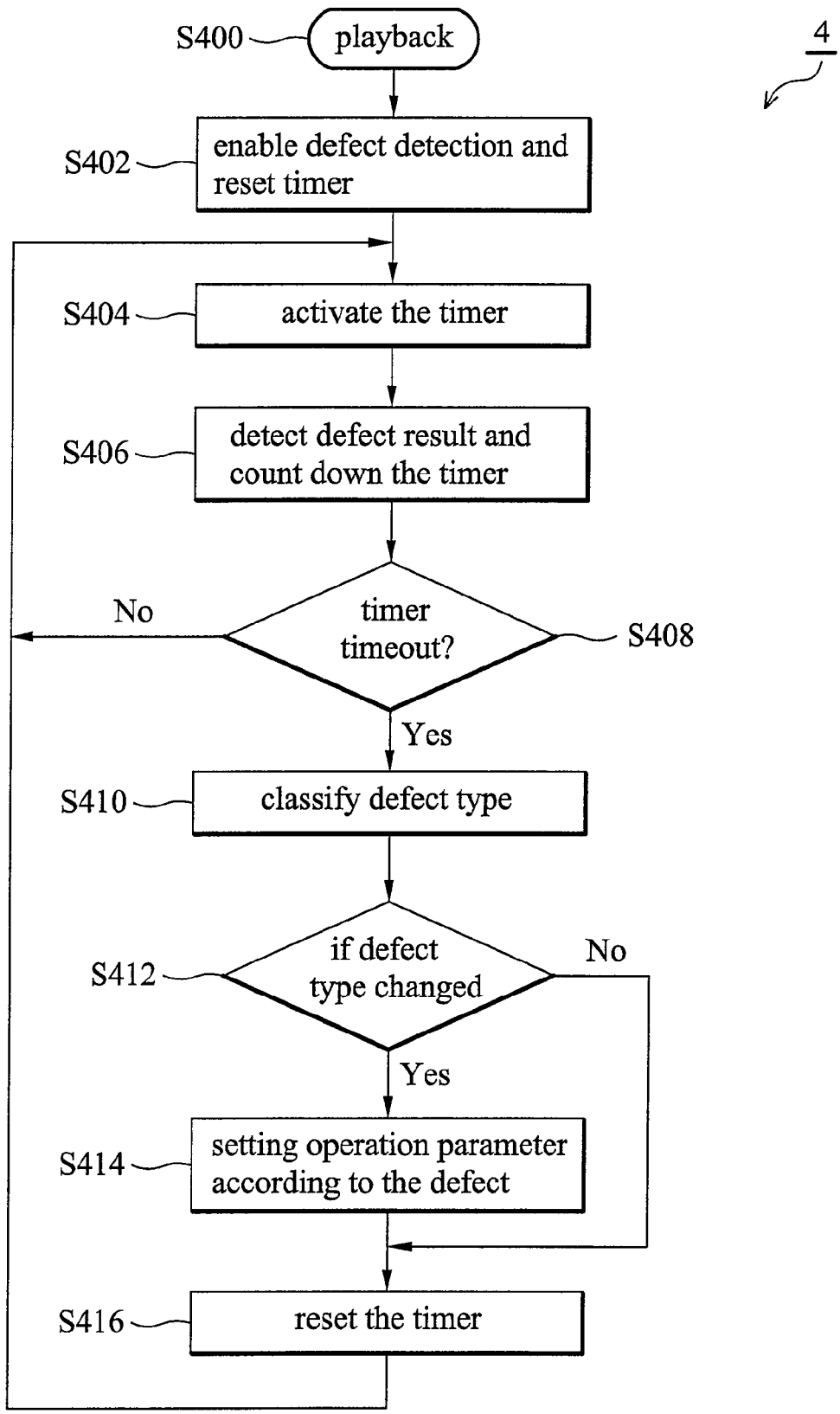
FIG. 4 is a flowchart of another exemplary method for controlling an optical disc drive, incorporating the optical disc player in FIG. 1.

FIG. 4 is a flowchart of another exemplary method for controlling an optical disc drive, incorporating the optical disc player in FIG. 1.

Upon playback in step S400, controller 102 initiates defect detection process and resets a timer to a predetermined timeout value (timeout window) as timer count Ct (S402). The timer may be a countdown counter or a count-up counter, depending on the implementation. For simplicity of explanation, the timer uses a countdown counter to illustrate the operation.

In step S404, controller 102 activates the timer, and the timer decrements timer count Ct by 1 upon every monitor period (for example 20 ms), and concurrently optical pickup head 100 moves forward along the track on optical disc 12 to detect any defect thereon (S406).

Next in step S408, controller 102 determines whether timer count Ct reaches the timeout condition, i.e., Ct=0 (S408). If so then controller 102 classifies the defect in step S410, if not, goes back to step S404 to keep the timer counting down.

In step S410, controller 102 calculates the number $N_d$ of defects before timeout, and classifies the defect type according thereto. Controller 102 may classify the defect type based on the occurrence frequency of the defect every timeout window. For example, controller 102 determines the defect type as a heavy defect type if the number of the defects exceeds or equals a predetermined defect threshold, determines as a light defect type if the number of the defects is less than the predetermined defect threshold, or determine as a no defect type if there is no defect.

Figure 5A:
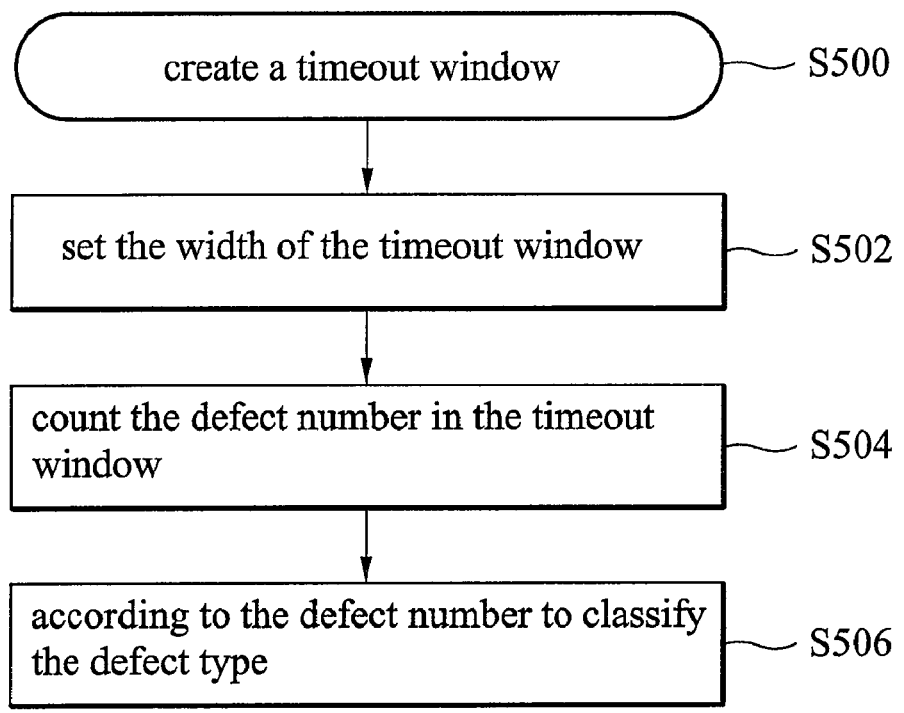
FIG. 5a is a flowchart of another exemplary method for classifying a defect type, incorporated in the methods in FIG. 4 and the optical disc player in FIG. 1.

FIG. 5a is a flowchart of another exemplary method for classifying a defect type, incorporated in the methods in FIG. 4 and the optical disc player in FIG. 1. In step S500, controller 102 creates a timeout window by a timer and assigns the width of the timeout window by the predetermined timeout value (S502), in order to collect defect statistics for each timeout window. Next in step S504, controller 102 calculates total number $N_d$ of the defects in the timeout window, and classifies the defect type according thereto (S506).

Figure 5B:
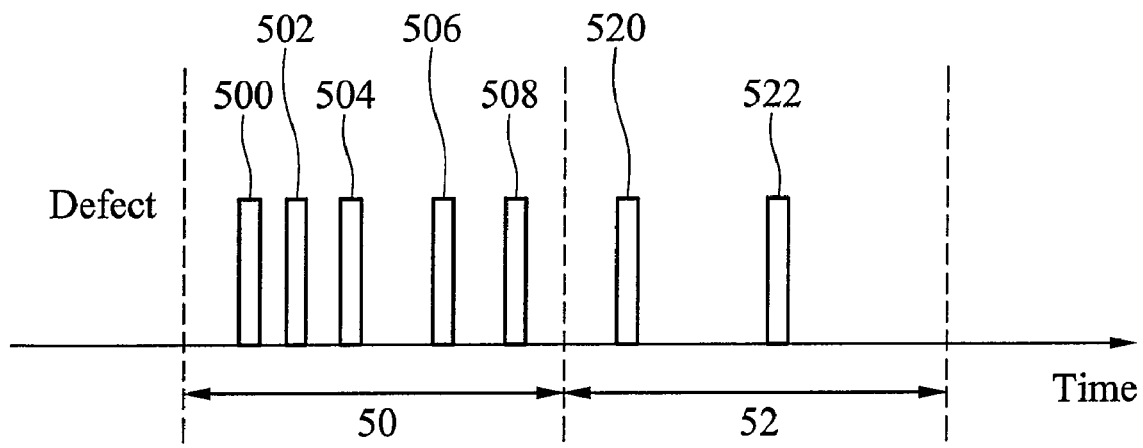

FIG. 5b is an illustration of the method for classifying the defect type in FIG. 5a, comprising timeout windows 50 and 52, defects 500 through 508 in window 50, and defects 520 and 522 in window 52. Timeout window 50 comprises 5 defects and window 52 comprises 2 defects. If the predetermined defect threshold is 3, controller 102 classifies window 50 to be heavy defect type and window 52 as light defect type.

Referring to FIG. 4, in step S412, controller 102 checks whether the defect type has been changed, and, if so then determines one or more operating parameter according thereto (S414), and, if not, the operating parameters remain the same and timer 1022 is reset again (S416).

In step S414, controller 102 determines particular operating parameters according to the defect type, thereby optimizing the playability of optical disc player 10. The determination of the operating parameter may include fixing focus error signal FE and tracking error signal TE at a predetermined value, a value immediately before the defective location, or a value after passing a low pass filter, increasing or decreasing the gain of focus error signal FE and tracking error signal TE, adjusting defect threshold level, fixing PLL gain and bandwidth at a predetermined value or a value immediately before the defect detection; fixing the bandwidth of the filters in data processing unit 106 at a predetermined value or a value immediately before the defect detection. Controller 102 may deploy lookup table 1020 to determine the corresponding configuration of the operating parameters by the defect type.

In Step S416, the timer is reset to the predetermined timeout value so that the defect detection may be performed for another timeout window.

The two methods shown in the flowcharts of FIG. 2 and FIG. 4 are only two examples, and people of ordinary skill in the art should be able to derive similar methods such as classifying the defect type according to one or a combination of various defect or scratch measures.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of controlling an optical disc drive, comprising:
    detecting a defect in a predetermined range on an optical disc;
    identifying a defect type based on the detecting result, wherein identification the defect type further comprises the steps of:
        calculating a number of defects in the predetermined range; and
        classifying the defect type based on the number of defects; and
    determining an operating parameter of the optical disc drive according to the defect type.

2. The method of claim 1, wherein classification the defect type further comprises the steps of:
    determining the defect type as a heavy defect type if the number of defects exceed or equal a predetermined defect threshold;
    determining the defect type as a light defect type if the number of defects are fewer than the predetermined defect threshold; and
    determining the defect type as a no defect type if there is no defect.

3. The method of claim 1, wherein identification the defect type further comprises the steps of:
    determining a maximum width of the defects in the predetermined range; and
    classifying the defect type based on the number and the maximum width of the defects.

4. The method of claim 3, wherein classification comprises:
    computing a ratio of the maximum width to the number of defects;
    determining the defect type as a concentrated defect type if the ratio exceeds or equals a predetermined ratio threshold; and
    determining the defect type as a dispersive defect type if the ratio is less than the predetermined ratio threshold.

5. The method of claim 1, wherein the predetermined range is a concentric region on the optical disc, and the detection step comprises detecting the defects on a cycle in the concentric predetermined range.

6. The method of claim 1, further comprising determining whether a current position of the optical disc read by the optical disc drive is in the predetermined range, if the current position is in another range, detecting defects and identifying a defect type to determine the operating parameter for the another range including the current position.

7. The method of claim 6, wherein determination of whether the current position is in the predetermined range is performed when servo is jumping between tracks of the optical disc.

8. The method of claim 1, wherein the defect detection step further comprises:
    providing a timeout duration;
    counting down a time count; and
    determining the defect type when the time count reaches the timeout duration.

9. An optical disc drive, comprising:
    a rotating means, rotating an optical disc;
    an optical pickup head, generating an optical beam to detect a defect in a predetermined range on the optical disc;
    a servo unit, coupled to the optical pickup head, responsive to an operating parameter to control the optical pickup head; and
    a controller, coupled to the optical pickup head and the servo unit, identifying a defect type, and determining the operating parameter of the servo unit according to the defect type, wherein the controller identifies the defect type by calculating a number of defects in the predetermine range, and classifying the defect type based on the number of defects.

10. The optical disc drive of claim 9, wherein the controller classifies the defect type by:
    determining the defect type as a heavy defect type if the number of defects exceeds or equals a predetermined defect threshold;
    determining the defect type as a light defect type if the number of defects is less than the predetermined defect threshold; and
    determining the defect type as a no defect type if there is no defect.

11. The optical disc drive of claim 9, wherein the controller identifies the defect type by:
    determining a maximum width of the defects in the predetermined range; and
    classifying the defect type based on the number of defects and the maximum width of the defects.

12. The optical disc drive of claim 11, wherein the controller classifies the defect type by:
    estimating a ratio of the maximum width to the number of defect;
    determining the defect type as a concentrated defect type if the ratio exceeds or equals a predetermined ratio threshold; and
    determining the defect type as a dispersive defect type if the ratio is less than the predetermined ratio threshold.

13. The optical disc drive of claim 9, wherein the predetermined range is a concentric region on the optical disc, and the optical pickup head detects the defects on a cycle in the predetermined range.

14. The optical disc drive of claim 9, wherein the controller further determines whether a current position of the optical disc read by the optical pickup head is in the predetermined range, and if the current position is in another range, detecting defects and identifying a defect type to determine the operating parameter for the another range including the current position.

15. The optical disc drive of claim 14, wherein the controller determines whether the current position is in the predetermined range when the servo unit is jumping between tracks of the optical disc.

16. The optical disc drive of claim 9, wherein the controller further provides a timeout duration, and counting down a time count while detecting the defects, and the controller identifies the defect type when the time count reaches the timeout duration.

* * * * *